US006273987B1

(12) United States Patent
Wilkey

(10) Patent No.: US 6,273,987 B1
(45) Date of Patent: Aug. 14, 2001

(54) METHOD OF MANUFACTURING LABELS

(76) Inventor: Andrew William Wilkey, Boverton Park House, Boverton, Llantwit Major, S. Glamorgan CF61 1UH (GB)

(*) Notice: Subject to any disclaimer, the term of this patent is extended or adjusted under 35 U.S.C. 154(b) by 0 days.

(21) Appl. No.: 09/068,628

(22) PCT Filed: Nov. 7, 1996

(86) PCT No.: PCT/GB96/02731

§ 371 Date: May 6, 1998

§ 102(e) Date: May 6, 1998

(87) PCT Pub. No.: WO97/17194

PCT Pub. Date: May 15, 1997

(30) Foreign Application Priority Data

Nov. 8, 1995 (GB) ..... 9522863
Jun. 12, 1996 (GB) ..... 9612244

(51) Int. Cl.[7] ..... B32B 7/06; B32B 7/14; B32B 31/12; B32B 31/18; B31D 1/02

(52) U.S. Cl. ..... 156/277; 156/270; 156/278; 156/280; 156/289; 156/291; 156/305; 156/324; 428/41.8; 428/41.9; 428/42.2; 428/42.3; 428/343

(58) Field of Search ..... 156/268, 248, 156/270, 277, 289, 291, 324, 272.8, 85, 305, 278, 280; 428/41.8, 42.2, 42.3, 41.9, 343, 352

(56) References Cited

U.S. PATENT DOCUMENTS 3,885,334 5/1975 Banks ..... 40/2 R
4,068,028 * 1/1978 Samonides ..... 156/277 X
4,273,606 6/1981 Trilli ..... 156/388
5,190,609 * 3/1993 Lin et al. ..... 156/277 X
5,284,689 * 2/1994 Laurash et al. .
5,405,475 * 4/1995 Kraft et al. ..... 156/277 X
5,487,807 * 1/1996 Nedblake et al. .
5,562,789 * 10/1996 Hoffmann ..... 156/277 X
5,580,640 * 12/1996 Kraft et al. .
5,632,842 * 5/1997 Oliver et al. ..... 156/268
5,741,381 * 4/1998 Dolence et al. ..... 156/277 X
5,747,192 * 5/1998 Hughen et al. .
5,827,389 * 10/1998 Takizawa et al. ..... 156/277 X

FOREIGN PATENT DOCUMENTS 2198701 6/1988 (GB) .
2239855 7/1991 (GB) .
2240510 8/1991 (GB) .
9322116 11/1993 (WO) .

OTHER PUBLICATIONS

Arthur L. Berman et al., "Labels: A Product Knowledge Book," National Business Forms Association, pp. v–144, 1983.*

* cited by examiner

*Primary Examiner*—Curtis Mayes
(74) *Attorney, Agent, or Firm*—Edwin D. Schindler

(57) ABSTRACT

A strip of self-adhesive labels is formed by providing a backing strip having a labelling strip superimposed over it then dividing the labelling strip into successive labels and waste regions. The waste regions are more firmly secured to the backing strip than the labels and effectively reinforce the strength of the labelling strip for passage through a label application machine.

48 Claims, 3 Drawing Sheets

METHOD OF MANUFACTURING LABELS

The present invention relates to a method of manufacturing self-adhesive labels.

It is common to provide successive labels on a strip of backing paper, and to apply those labels using a machine which peels the labels one-by-one from the backing strip and applies them to respective products. In preparing such a strip of labels, a strip of silicone coated backing paper is first provided with a coating of adhesive over a front side thereof. A labelling strip is then adhered to this side of the backing paper, the labelling strip being printed with successive labels over its front surface, and then divided (typically by die cutting), to form individual rectangular labels (each label being separated from the next label by a dividing line extending across the labelling strip) The adhesive transfers from the backing paper to the rear surfaces of the labels to enable each label, when removed from the backing paper, to adhere to its intended product.

I have now devised a method of manufacturing a strip of self-adhesive labels, which enables the labels to be of any desired shape.

In accordance with the present invention, there is provided a method of forming a strip of self-adhesive labels, comprising providing a backing strip having a labelling strip superimposed over and secured to it, then dividing the labelling strip into successive labels and waste regions, the waste regions of the labelling strip being more firmly secured to the backing strip than the labels.

Preferably the waste regions form one or more webs which extend continuously along the length of the labelling strip. Thus, because the waste regions of the labelling strip are more firmly bonded to the backing strip than the labels, then the waste material may be used to help carry the labels through labelling machinery. This overcomes a common problem associated with existing label strips, which is that during the label application process, the backing strip is prone to breakages. Also, the arrangement is desirable where there is a risk of labels being inadvertently removed from the backing strip together with the waste material.

It will be appreciated by bonding the waste material to the backing strip to help carry the labels through the labelling machinery, the thickness of the backing strip may be greatly reduced. Despite this reduction in thickness of the backing strip, the combined strip remains far stronger, and therefore less prone to breakages, than would be the backing strip alone. As the overall thickness of the strip of labels is correspondingly reduced, a greater number of labels may therefore be carried on a roll of the same diameter. Thus, in a labelling plant, roll changes will be required much less frequently. In such a labelling plant, labels are applied to their intended products by removing them individually from the backing strip, leaving the waste material in place.

Preferably the successive labels are formed on the labelling strip by printing onto the rear and/or front surface of the labelling strip. Preferably adhesive is applied either to the rear surface of the labelling strip or to the front surface of the backing strip, before the labelling strip is superimposed over the backing strip. Preferably the adhesive is applied in-line with the printing process. Preferably the labelling strip is superimposed over the backing strip, in-line with the printing and adhesive-application processes. Preferably the step of dividing the labelling strip (into successive label and waste regions) is carried out in-line with the step of superimposing the labelling strip over the backing strip. The dividing step may be carried out for example by die cutting or by laser cutting.

During manufacture of the strip of labels, preferably the backing strip is coated with a release agent (e.g. silicone) over discrete portions of its surface which correspond to individual labels of the labelling strip, the release agent coating extending at least over areas of the backing strip which correspond with areas of the labelling strip which are immediately adjacent the peripheral edges of the respective labels. Preferably the areas of release agent extend beyond the peripheral edges of the labels, to provide a degree of tolerance for the die-cutting operation.

It will be appreciated that, as only a relatively small proportion of the surface area of the backing strip is coated with a release agent, the backing strip is more suitable for re-cycling.

In addition, or as an alternative to providing coatings of release agent, an adhesive may be applied to the waste regions of the labelling strip which is stronger than the adhesive applied to the label regions, or a solvent may be applied to the waste regions which causes these to bond to the backing strip, or the waste regions may be bonded to the backing strip by a welding process, e.g. using heat and pressure, or laser welding.

It will be appreciated that the waste regions of the labelling strip may be bonded to the backing strip over discrete areas only of the waste regions.

In another embodiment of the present invention, the front surface of each label is coated with contact adhesive so that, upon contacting an article to be labelled, the front surface of each label will adhere to that article and be peeled from the backing strip. This arrangement has the advantage of allowing the labelling strip to be used in high speed continuous label application machines, which at present involve the use of hot melt adhesive applied to the labels in-line with label-application.

Preferably the step of coating the front surface of each label with adhesive is carried out in-line with the step of dividing the labelling strip (into successive label and waste regions;). Preferably the rear surface of the backing strip is coated with a release agent (e.g. silicone) so that the strip of labels may be wound upon itself. Preferably the step of coating the rear surface of the backing strip with release agent is carried out immediately prior to the step of applying adhesive to the rear surface of the labelling strip or to the front surface of the backing strip. Preferably, prior to its release, each label is only partially adhered to the backing strip. Discrete areas of the rear surface of the labelling strip, which correspond to label regions, may be coated with a release agent (e.g. silicone) so that, having been released from the backing strip, there is no adhesive carried upon the rear surfaces of the labels. In this case, the step of coating discrete areas of the rear surface of the labelling strip with silicone would preferably be carried out in-line with the step of superimposing the labelling strip over the backing strip.

In each of the above embodiments, the labelling strip preferably comprises a plastics material, which is preferably transparent to enable printing applied to its rear surface to be visible, and may comprise a heat-shrinkable plastics material, so that the individual labels are heat-shrinkable after their application to intended products.

Preferably the backing strip also comprises plastics material, this arrangement being desirable in that it allows the waste regions and backing strip to be simultaneously recycled.

It will be appreciated that the individual labels which are formed may be of any desired shape.

Also in accordance with the present invention, there is provided a strip of self-adhesive labels which comprises a backing strip having a labelling strip superimposed and adhered to it, the labelling strip being divided into successive labels and waste regions, the waste regions being more firmly secured to the backing strip than the labels.

Embodiments of this invention will now be described by way of examples only and with reference to the accompanying figures, in which.

Figure 1:
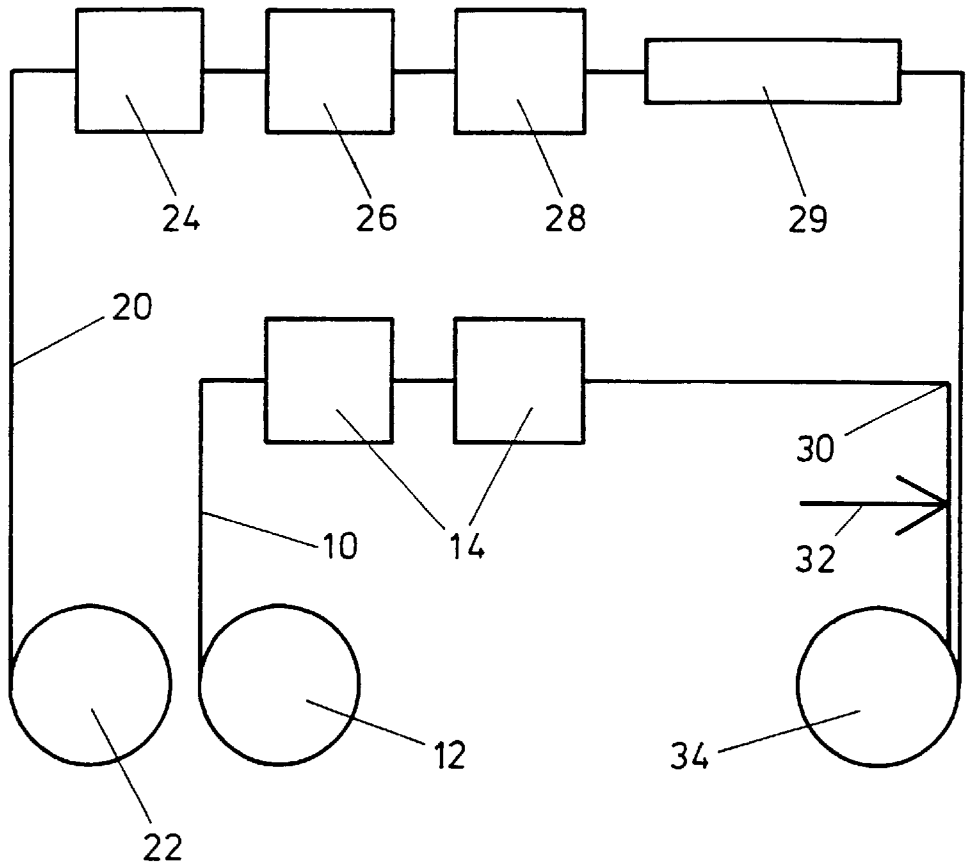
FIG. 1 is a diagram to explain one method by which a strip of labels may be formed in accordance with the present invention.

Referring to FIG. 1 of the figures, in order to produce a strip of labels in accordance with a first embodiment of the present invention, two strips 10, 20 of plastics material are dispensed simultaneously from respective rolls, 12, 22, the two strips being concurrently subjected to various respective processes before being brought together to form a finished strip of labels.

The first strip 10 of transparent plastics labelling material is dispensed from the roll 12 and passes through a series of printing stations 14 where one or more layers of print are applied to its rear and/or its front side.

In certain circumstances, it may be desirable for a first layer of print to be applied to the rear of each label, so that the print is visible from the front side of the label, the first layer of print being subsequently printed with an opaque layer and then a second layer of print being applied to the opaque layer so that the second layer of print is visible from the rear side of the label, if viewed through a transparent package or container to which it is applied.

The plastics material of the labelling strip 10 preferably comprises heat-shrinkable material so that, having been applied to an item, heat may be applied to a label to eliminate any wrinkles or creases in its surface.

The second strip 20 of plastics backing material is dispensed from the roll 22, and has its reverse face coated, by a coating head 24, with a release agent (preferably silicone) over discrete areas corresponding to individual labels. The release agent is dried by exposure to ultra-violet (UV) irradiation at a drying head 26, before a coating of adhesive is applied to its reverse face at a station 28. The adhesive preferably comprises a contact adhesive which may either completely or partially coat the reverse face of the backing strip. The adhesive is dried by passing the backing strip through an infra-red (IR) drying tunnel 29. Alternatively, the adhesive may comprise a hot melt adhesive, in which case the adhesive may be dried by exposure to ultra violet radiation.

It will be appreciated that, if the backing strip 20 were instead passed through a sufficiently long drying tunnel subsequent to the adhesive application step, then the adhesive would dry without IR or UV irradiation.

The labelling strip 10 and the backing strip 20, having been formed accordingly, are brought together at a point 30 so that the labelling strip is superimposed over and adheres to the backing strip. The labelling strip 10 is then die-cut at 32 to form consecutive labels within the labelling strip, before the finished strip is wound upon a roll 34.

Figure 2:
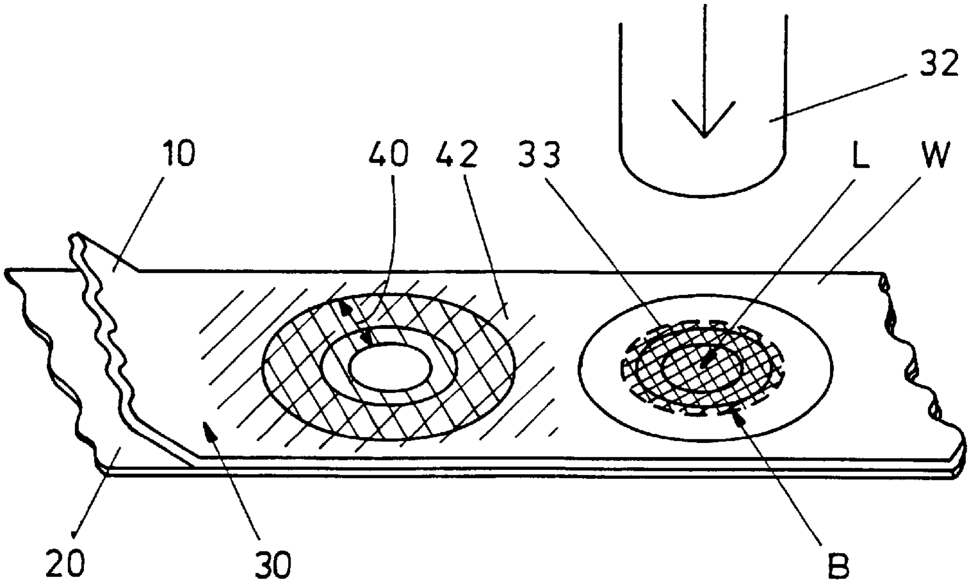
FIG. 2 is a perspective view of a strip of labels formed according the method shown in FIG. 1.

FIG. 2 illustrates, by way of example, a strip of labels formed according to the method of FIG. 1, the labelling strip 10 and the backing strip 20 being brought together at the point 30, prior to a label being formed in the leading portion of the labelling strip by a die-cutting tool 32.

As shown in FIG. 2, the backing strip 20 is coated with release agent over successive areas 40 which correspond to the peripheries of successive labels. An outer portion of each such area 40 is overlapped by the adhesive coating 42 on the backing strip 20, so that outside the silicone coated region 40, the adhesive forms a permanent bond between the labelling strip 10 and the backing strip 20, whereas the adhesive within each label region is prevented from forming a permanent bond and migrates from the backing strip 20 to the reverse surface of its respective label. Thus, once separated from the remainder of the labelling strip 10 by means of cutting tool 32, an adhesive coated label L may be easily removed from the backing strip whilst waste material W is retained in place.

The dashed line 33 in FIG. 2 indicates a cut, made by the die-cutting tool 32, which defines the periphery of a label L. The label thus formed has an outer peripheral adhesive coated region B, and a centre region having no adhesive applied thereto. It will be appreciated that the centre region of each label may be coated over one or more areas thereof, or indeed over its entire area, with adhesive, for which corresponding areas of silicone release agent would be required on the backing strip.

As shown in FIG. 2, the areas of silicone release agent extend beyond the periphery of their respective labels. Such an arrangement is desirable in that it provides a safeguard against any misalignment of the cutting tool 32.

The finished strip of labels is wound upon the roll 34 so that it may be subsequently unwound to have its labels removed for application to individual articles. The relative thicknesses of the adhered labelling and backing strips provide a significant advantage over existing label-bearing strips in that the continuous web of residual waste material W in the labelling strip (as opposed to the backing strip) may be used to help carry the labels through labelling machinery. A much thinner backing layer is therefore required, which results in an increased number of labels being carried upon a roll of the same diameter. When used with existing labelling machinery to which the strips are most suitable, fewer roll changes are therefore required per production run.

Also, as a strip of labels manufactured in accordance with this first embodiment of the present invention comprises less silicone release agent than conventional arrangements, then the waste material produced when applying the labels is more suitable for recycling, recycling being a particularly desirable option where the labelling and backing strips are formed of the same material so that they may be simultaneously processed.

Figure 3:
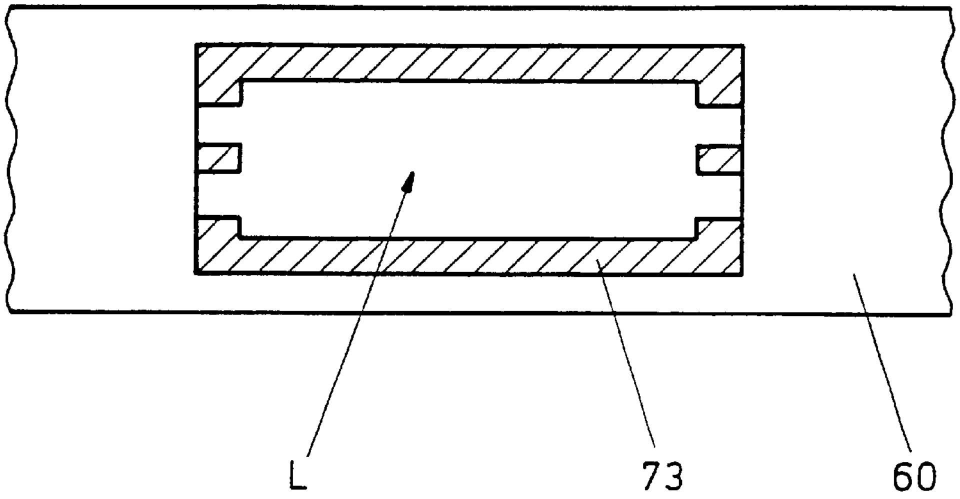
FIG. 3 is a plan view of a strip of labels formed by another method in accordance with the present invention.
Figure 4:
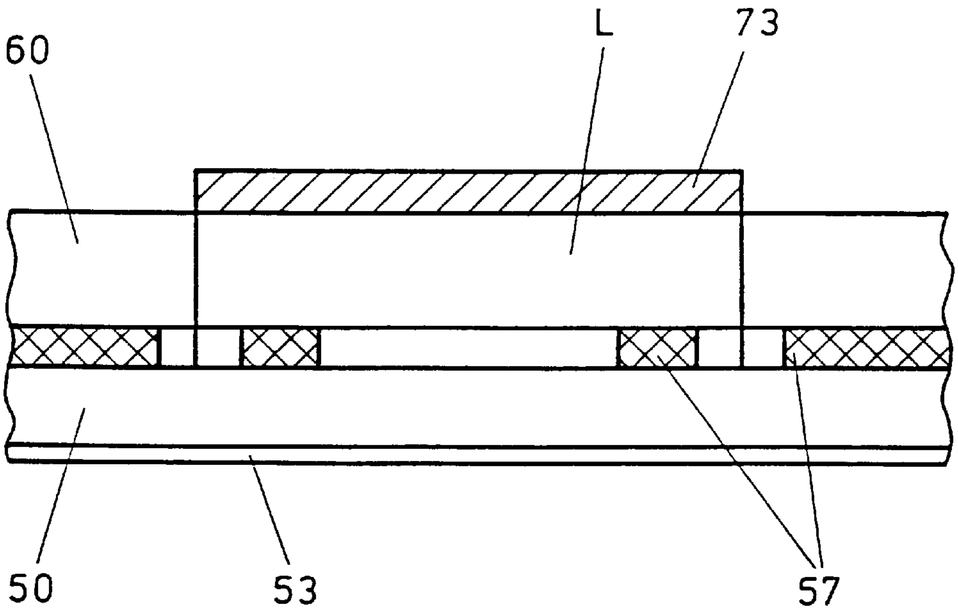
FIG. 4 is a section through the strip of labels of FIG. 3.
Figure 5:
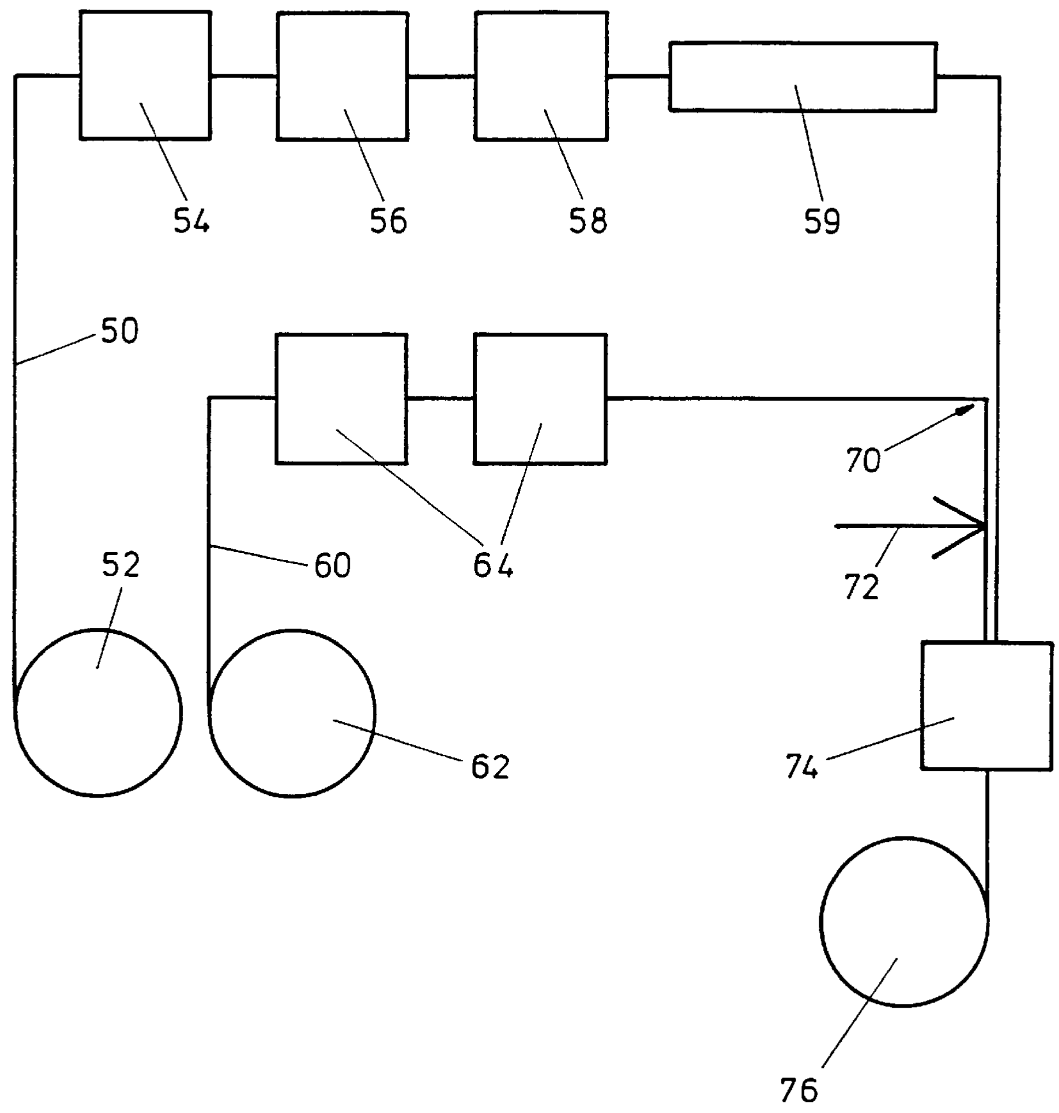
FIG. 5 is a diagram to explain the method of forming the strip of labels shown in FIGS. 3 and 4.

FIGS. 3 and 4 show a strip of labels formed in accordance with another embodiment of the present invention, wherein the labels are intended to be applied to products in a high speed continuous process. The method of forming such a strip is shown schematically in FIG. 5, in which the backing strip 50, dispensed from a roll 52, is first coated with a release agent 53 (e.g. silicone) over its front face, by a coating head 54, and this release coat is subsequently dried by exposure to ultra-violet radiation at a drying head 56. A coating of adhesive 57 is next applied to the reverse face of the backing strip at an adhesive printing station 58. The adhesive 57 covers partly or entirely those regions which correspond to respective waste regions of the labelling strip, and covers only partially those regions corresponding to individual labels themselves, such that the labels are less firmly bonded to the backing strip. If desired, a weaker (peelable) adhesive is applied in the label areas than in the waste areas. Next the adhesive is dried by passing the backing strip through an infra-red drying tunnel 59.

Whilst the backing strip is being thus formed, a labelling strip 60 is dispensed from a second roll 62 and printed upon its front face at print stations 64.

The two strips 50 and 60 are then brought together at point 70 so that the labelling strip is superimposed over and adheres to the backing strip. The labelling strip is then diecut at a station 72 to form consecutive labels within the labelling strip, and a further coating of adhesive 73 is applied at a station 74 to the front surface of the labelling strip over those areas corresponding to the peripheries of individual labels. The finished strip of labels is finally wound upon a roll 76, the release coating 53 of the front face of the backing strip 50 preventing it from adhering to the exposed adhesive 73 of the labelling strip 60. It will be noted from FIG. 3 that the adhesive 73 at the opposite ends of the label L are interrupted: this is to align with slotted rollers over which the labelling strip runs in the label applicator machine, to avoid the adhesive coming into contact with the surfaces of the rollers.

The significant advantage of the labelling strip of FIGS. 3 and 4 is that, in order to apply each label to its intended article, it is not necessary to first remove the label from the backing strip in order to expose its adhesive. Instead, if the contact adhesive coating 73 at a leading end of a label is brought into contact with the surface of the article to which it is to be applied, then the label becomes more strongly adhered to that surface than to the backing strip so that, upon separating the strip of labels from the article, the label is released from the backing strip but remains adhered to the article.

Preferably, the discrete adhesive regions which adhere the individual labels to the backing strip do not migrate to the rear of the labelling strip. This may be achieved by coating corresponding portions of the rear face of each label region with release agent e.g. silicone.

What is claimed is:

1. A method for forming a strip of self-adhesive labels, comprising the steps of:

providing a backing strip and a labelling strip, each of said backing strip and said labelling strip having a front surface and a rear surface, said labelling strip to be divided into successive labels and waste regions;

partially coating with a release agent each area of the front surface of said backing strip that is to underlie a peripheral portion of a respective label to form a release-agent-coated portion of each area of the front surface of said backing strip, thereby leaving the front surface of said backing strip that is to underlie the waste regions of the labelling strip substantially free of the release agent and leaving areas of the front surface of said backing strip that are to underlie the respective labels substantially free of release agent;

securing said backing strip and said labelling strip to one another by areas of adhesive corresponding with the areas of the front surface of said backing strip that are to underlie the waste regions of the labelling strip and corresponding with the release-agent-coated portion of each area of the front surface of said backing strip that is underlie the peripheral portion of a respective label, thereby leaving adhesive-free areas of the labels corresponding with the areas of the front surface of said backing strip which are substantially free of release agent that are to underlie the respective labels; and, dividing said labelling strip into successive labels and waste regions.

2. The method for forming a strip of self-adhesive labels according to claim 1, wherein said backing strip is partially coated with said release agent in line with said step of securing said backing strip to said labelling strip.

3. The method for forming a strip of self-adhesive labels according to claim 1, wherein, prior to said step of securing said backing strip to said labelling strip, said areas of adhesive are applied to the front surface of said backing strip.

4. The method for forming a strip of self-adhesive labels according to claim 3, wherein said areas of adhesive are applied to the front surface of said backing strip in line with said step of securing said backing strip to said labelling strip.

5. The method for forming a strip of self-adhesive labels according to claim 1, wherein, prior to said step of securing said backing strip to said labelling strip, said labelling strip is printed with discrete regions of print, each of said discrete regions of print corresponding with a respective area of said labelling strip which is to form a label.

6. The method for forming a strip of self-adhesive labels according to claim 5, wherein said discrete regions of print are printed on the rear surface of said labelling strip.

7. The method for forming a strip of self-adhesive labels according to claim 5, wherein said labelling strip is printed with said discrete regions of print in line with the application of areas of adhesive thereto.

8. The method for forming a strip of self-adhesive labels according to claim 1, wherein areas of the front surface of said backing strip that are to underlie portions of the waste regions immediately adjacent edges of each of said labels are coated with the release agent.

9. The method for forming a strip of self-adhesive labels according to claim 1, wherein said release-agent-coated portion of each area of the front surface of said backing strip that is to underlie a respective label overlaps its corresponding area of adhesive.

10. The method for forming a strip of self-adhesive labels according to claim 1, wherein said labelling strip is divided to form at least one continuous web of waste material extending continuously along the length of said labelling strip.

11. The method for forming a strip of self-adhesive labels according to claim 1, wherein said dividing step is carried out by die-cutting said labelling strip.

12. A method for forming a strip of self-adhesive labels, comprising the steps of:

providing a backing strip and a labelling strip, each of said backing strip and said labelling strip having a front surface and a rear surface, said labelling strip to be divided into successive labels and waste regions;

partially coating with a release agent each area of the front surface of said backing strip that is to underlie a respective label to form a release-agent-coated portion of each area of the front surface of said backing strip, thereby leaving the front surface of said backing strip that is to underlie the waste regions of the labelling strip substantially free of the release agent and leaving areas of the front surface of said backing strip that are to underlie the respective labels substantially free of release agent;

printing discrete regions of print on the rear surface of said labelling strip securing said backing strip and said labelling strip to one another by areas of adhesive corresponding with the areas of the front surface of said backing strip that are to underlie the waste regions of the labelling strip and corresponding with the release-agent-coated portion of each area of the front surface of said backing strip that is underlie a respective label, thereby leaving adhesive-free areas of the labels corresponding with the areas of the front surface of said backing strip which are substantially free of release agent that are to underlie the respective labels; and, dividing said labelling strip into successive labels and waste regions, wherein each of said discrete regions of print corresponds with a respective area of said labelling strip which is to form a label.

13. The method for forming a strip of self-adhesive labels according to claim 12, wherein said backing strip is partially coated with said release agent in line with said step of securing said backing strip to said labelling strip.

14. The method for forming a strip of self-adhesive labels according to claim 12, wherein, prior to said step of securing said backing strip to said labelling strip, said areas of adhesive are applied to the front surface of said backing strip.

15. The method for forming a strip of self-adhesive labels according to claim 14, wherein said areas of adhesive are applied to the front surface of said backing strip in line with said step of securing said backing strip to said labelling strip.

16. The method for forming a strip of self-adhesive labels according to claim 12, wherein said labelling strip is printed with said discrete regions of print in line with the application of areas of adhesive thereto.

17. The method for forming a strip of self-adhesive labels according to claim 12, wherein each area of the front surface of said backing strip that is to underlie a peripheral portion of a respective label is coated with the release agent.

18. The method for forming a strip of self-adhesive labels according to claim 17, wherein areas of the front surface of said backing strip that are to underlie portions of the waste regions immediately adjacent edges of each of said labels are coated with the release agent.

19. The method for forming a strip of self-adhesive labels according to claim 12, wherein said release-agent-coated portion of each area of the front surface of said backing strip that is to underlie a respective label overlaps its corresponding area of adhesive.

20. The method for forming a strip of self-adhesive labels according to claim 12, wherein said labelling strip is divided to form at least one continuous web of waste material extending continuously along the length of said labelling strip.

21. The method for forming a strip of self-adhesive labels according to claim 12, wherein said dividing step is carried out by die-cutting said labelling strip.

22. A method for forming a strip of self-adhesive labels, comprising the steps of:

providing a backing strip and a labelling strip, said backing strip and said labelling strip each having a front surface and a rear surface;

applying a first adhesive to discrete regions of the front surface of said backing strip corresponding with individual labels;

applying a second adhesive of greater strength than said first adhesive to regions of the front surface of said backing strip not corresponding with individual labels;

printing said labelling strip with discrete regions of print corresponding with individual labels;

superimposing the rear surface of said labelling strip to the front surface of said backing strip;

securing the rear surface of said labelling strip to the front surface of said backing strip; and, dividing said labelling strip into successive labels and waste regions, wherein the steps of applying said adhesives to the front surface of said backing strip and printing said labelling strip are each carried out in-line with the steps of securing the rear surface of said labelling strip to the front surface of said backing strip.

23. A method for forming a strip of self-adhesive labels, comprising the steps of:

providing a backing strip and a labelling strip, said backing strip and said labelling strip each having a front surface and a rear surface;

superimposing the rear surface of said labelling strip over the front surface of said backing strip;

securing the rear surface of said labelling strip to the front surface of said backing strip; and, dividing said labelling strip into successive labels and waste regions, wherein areas of said labelling strip corresponding with said waste regions are bonded to said backing strip by applying areas of solvent to either the rear surface of the labelling strip or to the front surface of the backing strip.

24. A method for forming a strip of self-adhesive labels, comprising the steps of:

providing a backing strip and a labelling strip, said backing strip and said labelling strip each having a front surface and a rear surface;

superimposing the rear surface of said labelling strip over the front surface of said backing strip;

securing the rear surface of said labelling strip to the front surface of said backing strip; and, dividing said labelling strip into successive labels and waste regions, wherein areas of said labelling strip corresponding with said waste regions are bonded to said backing strip via a welding process.

25. A method for forming a strip of self-adhesive labels, comprising the steps of:

providing a backing strip and a labelling strip, said backing strip and said labelling strip each having a front surface and a rear surface;

superimposing the rear surface of said labelling strip over the front surface of said backing strip;

securing the rear surface of said labelling strip to the front surface of said backing strip; and, dividing said labelling strip to successive labels and waste regions, wherein areas of the front surface of said labelling strip corresponding with said labels are coated with a contact adhesive.

26. a method as claimed in claim 25, wherein said adhesive coating comprises one or more adhesive-free strips extending along the length of said labelling strip.

27. A method as claimed in claim 25, wherein the step of coating the front surface of said labelling strip corresponding with said labels with adhesive is carried out in-line with the step of dividing said labelling strip into successive labels and waste regions.

28. a method as claimed in claim 25, wherein the rear surface of said backing strip is coated with a release agent.

29. A method as claimed in claim 28, wherein the step of coating the rear surface of said backing strip with release agent is carried out immediately prior to applying adhesive to the rear surface of said labelling strip or to the front surface of said backing strip to secure the two strips together.

30. A method as claimed in claim 25, wherein discrete areas of the rear surface of said labelling strip, which correspond with individual labels, are coated with a release agent.

31. a method as claimed in claim 30, wherein the step of coating discrete areas of the rear surface of said labelling strip with release agent is carried out in-line with the step of superimposing said labelling strip over said backing strip.

32. A strip of self-adhesive labels, comprising:

a release agent;

an adhesive;

a backing strip underlying successive labels and waste regions; and, a labelling strip superimposed over and secured to said backing strip, said labelling strip being divided into successive labels and waste regions, with each area of said backing strip underlying a respective label being partially coated with said release agent to underlie a peripheral portion of said respective label and said backing strip underlying the waste regions being substantially free of said release agent, said labelling strip and said backing strip being secured together by areas of said adhesive corresponding with the waste regions and corresponding with the release-agent-coated area of said backing strip underlying the peripheral portion of a respective label, leaving an adhesive free-area of said respective label corresponding with an area of a front surface of said backing strip, which is substantially free of said release agent, that is to underlie said respective label.

33. The strip of self-adhesive labels according to claim 32, wherein areas of said backing strip underlying portions of the waste regions immediately adjacent edges of the labels are coated with said release agent.

34. The strip of self-adhesive labels according to claim 32, wherein said release agent-coated portion of each area of a front surface of said backing strip underlying a respective label overlaps its corresponding area of said adhesive.

35. The strip of self-adhesive labels according to claim 32, wherein at least one continuous web of waste material extends continuously along the length of said labelling strip.

36. The strip of self-adhesive labels according to claim 32, wherein said labelling strip comprises a plastic material.

37. The strip of self-adhesive labels according to claim 32, wherein said labelling strip is transparent.

38. The strip of self-adhesive labels according to claim 32, wherein said labelling strip comprises a heat-shrinkable material.

39. The strip of self-adhesive labels according to claim 32, wherein said backing strip comprises plastic material.

40. A strip of self-adhesive labels, comprising:

a release agent;

an adhesive;

a backing strip for underlying successive labels; and, a labelling strip superimposed over, and secured to, said backing strip, said labelling strip being divided into successive fabels and waste regions, with each area of said backing strip underlying a respective label being partially coated with said release agent and areas of said backing strip underlying the waste regions being substantially free of said release agent, said labelling strip and said backing strip being secured together by areas of said adhesive corresponding with the waste regions and a release agent-coated portion of each area of said backing strip underlying a respective label, wherein a region of print is applied to a rear surface of each said label.

41. The strip of self-adhesive labels according to claim 40, wherein each area of a front surface of said backing strip that is to underlie a peripheral portion of a respective label is coated with said release agent.

42. The strip of self-adhesive labels according to claim 41, wherein areas of said backing strip underlying portions of the waste regions immediately adjacent edges of the labels are coated with said release agent.

43. The strip of self-adhesive labels according to claim 40, wherein said release agent-coated portion of each area of a front surface of said backing strip underlying a respective label overlaps its corresponding area of said adhesive.

44. The strip of self-adhesive labels according to claim 40, wherein at least one continuous web of waste material extends continuously along the length of said labelling strip.

45. The strip of self-adhesive labels according to claim 40, wherein said labelling strip comprises a plastic material.

46. The strip of self-adhesive labels according to claim 40, wherein said labelling strip is transparent.

47. The strip of self-adhesive labels according to claim 40, wherein said labelling strip comprises a heat-shrinkable material.

48. The strip of self-adhesive labels according to claim 40, wherein said backing strip comprises plastic material.

* * * * *